2 Sheets—Sheet 1.

T. S. LEWIS,

Assignor, by mesne assignments, to D. BREED.

MACHINE FOR REMOVING GREEN CORN FROM THE COB.

No. 9,845. Reissued Aug. 23, 1881.

WITNESSES

Wm A. Skinkle

Geo W. Buck

INVENTOR

Thirtum S. Lewis

N. PETERS, Photo-Lithographer, Washington, D. C.

T. S. LEWIS,
Assignor, by mesne assignments, to D. BREED.
MACHINE FOR REMOVING GREEN CORN FROM THE COB.
No. 9,845. Reissued Aug. 23, 1881.
Fig 3.
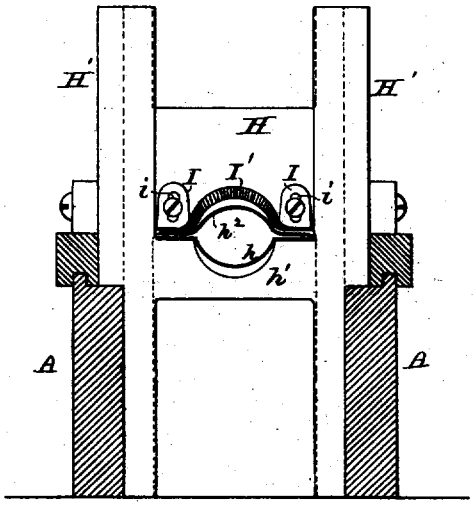
Fig. 5.
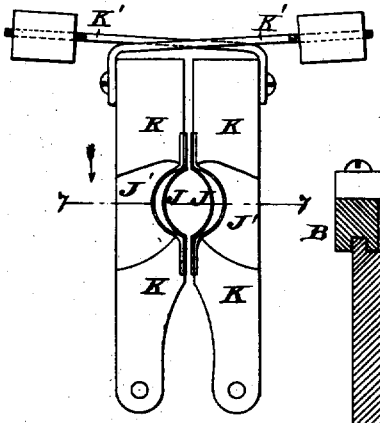
Fig 4.
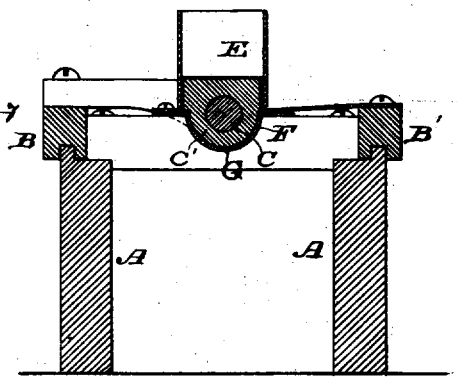
Fig. 6.
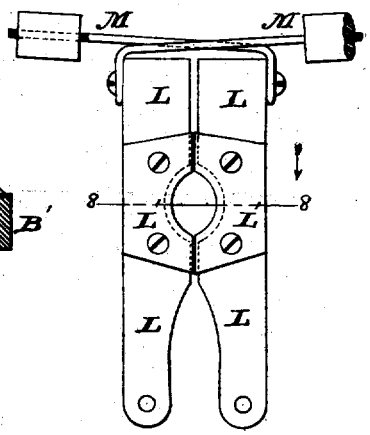
Fig 7.
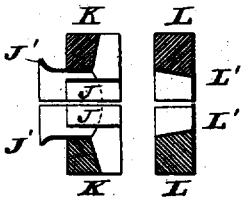
Fig. 8
WITNESSES
Wm A. Skinkle
Geo W. Buck
INVENTOR
Tristam S. Lewis
N. PETERS, Photo-Lithographer, Washington, D. C.

UNITED STATES PATENT OFFICE.

TRISTRAM S. LEWIS, OF SACO, MAINE, ASSIGNOR, BY MESNE ASSIGNMENTS, TO DANIEL BREED, OF WASHINGTON, DISTRICT OF COLUMBIA.

MACHINE FOR REMOVING GREEN CORN FROM THE COB.

SPECIFICATION forming part of Reissued Letters Patent No. 9,845, dated August 23, 1881.

Original No. 94,013, dated August 24, 1869. Application for reissue filed May 27, 1881.

*To all whom it may concern:*

Be it known that I, TRISTRAM S. LEWIS, a citizen of the United States, residing at Saco, in the county of York and State of Maine, have invented certain new and useful Improvements in Mechanism for Removing Green Corn from the Cob; and I do hereby declare that the same are fully described in the following specification, and illustrated in the accompanying drawings.

In preserving green corn in accordance with the approved process, more especially according to that patented by Isaac Winslow, it is indispensable to remove from the cob as much of the milk of the kernels as possible, in order to preserve the corn in its own juices, and in cutting the kernels from the cob there will be left upon it a series of little cups or hulls, within which the sweetest part and much of the milk of the grain resides.

The object of my invention, therefore, is to provide improved apparatus for cutting from ears of green corn the outer parts of the kernels, and for scraping from the cobs the remaining edible parts and juices of the corn.

My invention consists in the devices and combinations of devices set forth in the appended claims.

Figure 1:
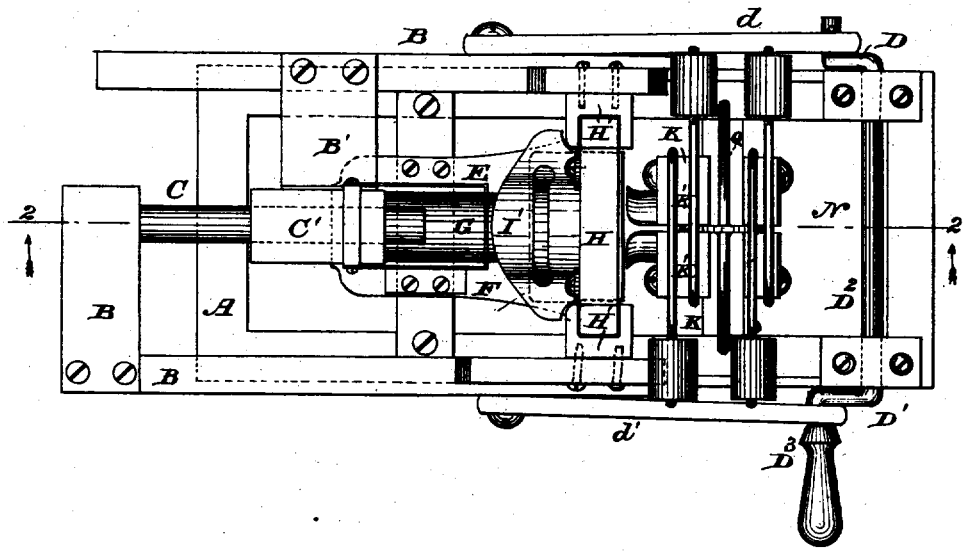
Figure 2:
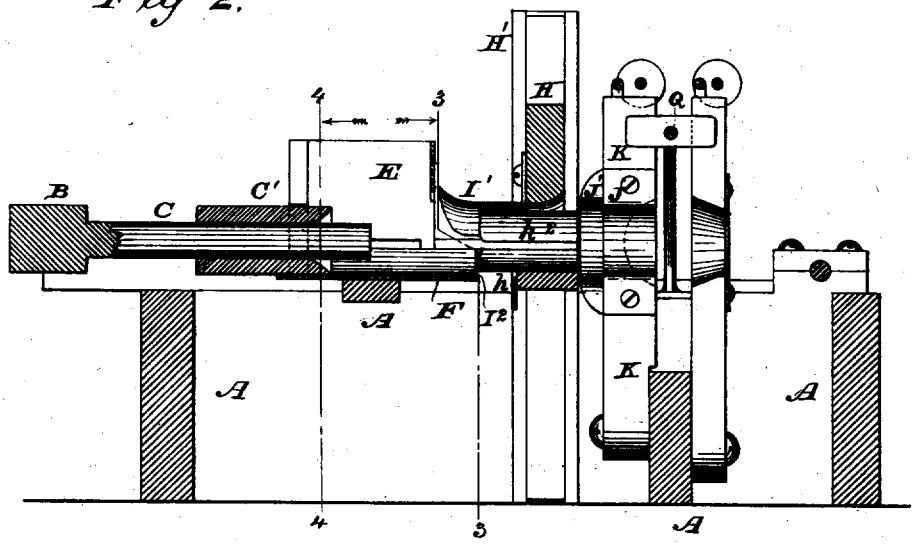

In the machine represented in the drawings, Figure 1 is a top-plan view of my improved machine. Fig. 2 is a longitudinal section taken on a vertical plane indicated by the line 2 2, Fig. 1. Fig. 3 is a vertical transverse section on the line 3 3, Fig. 2. Fig. 4 is a vertical transverse section on the line 4 4, Fig. 2. Fig. 5 illustrates a pair of weighted cutter-jaws and cutters. Fig. 6 shows a pair of weighted scraper-jaws and scrapers. Fig. 7 is a section through the cutter-jaws and cutters, taken on the line 7 7 of Fig. 5. Fig. 8. is a section through the scraper-jaws and scrapers, taken on the line 8 8, Fig. 6.

The operating parts of my machine are placed upon a convenient or proper frame, A. On the top of this frame, and moving on suitable ways or tracks, is a carriage, B, carrying a plunger, C, which has a reciprocating movement imparted to it by means of the crank D′ on a shaft, $D^2$, and the connecting-rod *d′*, or by any other power. The plunger C is connected by the horizontal arm with the carriage B. On the opposite side of the frame A is another carriage, B′, carrying a follower, C′, and reciprocated on suitable ways or tracks by means of an independent crank, D, and a connecting-rod, *d*. The two carriages B B′ move unequally on their ways, by reason of the different lengths of their cranks D D′, and hence the stroke of the plunger is longer and more rapid than that of the follower, through which it passes. The ends of the plunger and follower are slightly recessed, in order to receive the stalk or butt of the ear and retain it temporarily.

F is a plate secured to the frame of the machine, and formed with a groove or trough, G, upon which the ear of corn is laid and by which it is guided as it is pushed forward toward and between the cutters.

E indicates the vertical walls of a hopper, the bottom of which is the groove G, in which the ear to be operated upon is placed. Each end of the hopper is open for the passage of the follower and of the plunger, carrying the ear forward along the groove G.

The cutters and scrapers are arranged in pairs and are variously mounted. The several methods shown in the drawings represent fixed, sliding, and pivoted cutters, and pivoted scrapers. All have curved edges, in order to act upon the kernels and the cob in the manner best adapted to the ends in view. Each cutter is provided with a projecting curved gage, which, in use, is fixed at a definite distance from the blade, so as to regulate the depth of cut. These gages may be adjustable to different distances from the cutters by means of the slots *i* and set-screws I. The flaring ends of the gages adapt them to guide the ear properly to the cutters.

The lower cutter, *h*, of the first set is shown secured to a cross-piece, *h′*. Said cutter is placed at such a distance above the concave trough G as to enable said trough to act as a gage therefor. The upper cutter, $h^2$, of this set is secured to a sliding carrier, H, which rises and falls in grooves in the inner faces of the standards H′ H′ as the ear passes on. Adjoining these are two similarly-curved cutters, J J, secured to cutter-jaws K K, pivoted at their opposite ends to the frame, and arranged to open somewhat on their pivots as the ear enters, act on it with a yielding pressure as it passes, and close again when it has passed through. A similarly-pivoted set of jaws, L L, carry at their outer ends the scrapers L′ L′, which present to the cob a curved edge approximating the size of the cob. These pivoted jaws are likewise forced toward the axis of the cob by a yielding pressure. As shown in the drawings, such yielding pressure is afforded by means of weights M, mounted upon the ends of bent levers K′, and made adjustable by means of screw-threads, so that the pressure of cutters and scrapers toward the axis of the cob may be increased or diminished at will.

A curved brace or cross-piece, Q, is erected on the frame A in rear of the pivoted cutter-arms K K, to give a support to the cutters mounted thereon. This brace carries a stop at its apex, serving to keep the pivoted cutters and scrapers in proper position each side of the axis.

In practice the ear is placed in the concave groove or trough G when the plunger is at its rearmost position. Continued motion of the crank-shaft then carries forward the follower and the plunger, by means of which the ear is driven along the groove until the cutters $h$ $h^2$ sever portions of the kernels from its lower and upper sides, and the cutters J J cut away such as remain on the other sides. The scrapers then act upon the cob and remove the soft parts not cut off and the juices, leaving the cob uncut and the hulls remaining thereon. The edible parts drop into a suitable receptacle beneath the cutters and scrapers, and the cobs fall down near the end of the machine.

What I claim as my invention, and desire to secure by Letters Patent, is—

1. In a corn-cutting machine, the combination of pivoted curved cutters having flaring curved gages, with pivoted curved scrapers, a trough, a plunger, and suitable supporting and operating mechanism, for the purposes set forth.

2. In a corn-cutting machine, yielding pivoted scrapers and yielding pivoted cutters provided with gages, in combination with a trough, a reciprocating plunger, and a crank movement for operating said plunger.

3. A series of curved cutting-blades having curved gages, in combination with curved scrapers mounted on pivoted weighted arms, a trough for support of the ear, a plunger for driving it forward, and suitable operative mechanism therefor.

4. The combination, in a machine for removing green corn from the cob, of the sliding carriages B B′, respectively, carrying a plunger and a follower for feeding forward the ears of corn, with cutters adapted to cut the kernels of corn from the cob, substantially as described.

5. The combination, in a machine for removing green corn from the cob, of the sliding carriages B B′, respectively, carrying a plunger and a follower through which the said plunger works, a hopper provided with openings through which the follower passes to feed forward the corn, and cutters arranged at the terminus of a trough, along which the corn is forced by the forward reciprocation of the follower, substantially as described.

6. The combination, in a machine for removing green corn from the cob, of a reciprocating plunger and follower for feeding forward the ears of corn, with the cutters $h$ $h^2$, and the removable cutter frame or carrier H, substantially as described.

7. The combination, in a machine for removing green corn from the cob, of the reciprocating plunger for feeding forward the ear of corn, with cutters adapted to cut the kernels from the cob, and scrapers adapted to scrape the cob after it has passed the cutters, said scrapers being secured to pivoted jaws provided with weighted arms arranged to close the jaws, substantially as described.

TRISTRAM S. LEWIS.

Witnesses:
A. H. SPENCER,
E. A. PHELPS.